(12) United States Patent
Szentiványi

(10) Patent No.: US 8,888,897 B2
(45) Date of Patent: Nov. 18, 2014

(54) METHOD AND APPARATUS FOR HANDLING GASES

(76) Inventor: Péter Szentiványi, Szeged (HU)

( * ) Notice: Subject to any disclaimer, the term of this patent is extended or adjusted under 35 U.S.C. 154(b) by 60 days.

(21) Appl. No.: 13/512,458

(22) PCT Filed: Nov. 30, 2010

(86) PCT No.: PCT/HU2010/000133
§ 371 (c)(1),
(2), (4) Date: Jun. 26, 2012

(87) PCT Pub. No.: WO2011/064610
PCT Pub. Date: Jun. 3, 2011

(65) Prior Publication Data
US 2012/0260994 A1    Oct. 18, 2012

(30) Foreign Application Priority Data

Nov. 30, 2009    (HU) ...................................... 0900742
Nov. 30, 2009    (HU) ...................................... 0900743

(51) Int. Cl.
| | | |
|---|---|---|
| *B01D 47/02* | (2006.01) | |
| *B01D 19/00* | (2006.01) | |
| *F28C 3/06* | (2006.01) | |
| *F28B 3/06* | (2006.01) | |
| *F28D 21/00* | (2006.01) | |

(52) U.S. Cl.
CPC ........ *B01D 19/0036* (2013.01); *F28D 21/0003* (2013.01); *F28C 3/06* (2013.01); *F28B 3/06* (2013.01)
USPC .................... 95/226; 96/279; 96/351; 96/352

(58) Field of Classification Search
USPC ............. 95/226; 137/1; 261/38, 25, 127, 137
See application file for complete search history.

(56) References Cited

U.S. PATENT DOCUMENTS 3,332,214 A * 7/1967 Huppke ......................... 95/222
3,615,079 A    10/1971 Le Lara et al.
(Continued)

FOREIGN PATENT DOCUMENTS

| CH | 355796 | 7/1961 |
| DE | 10238229 | 3/2004 |
(Continued)

OTHER PUBLICATIONS

Alvin products, Metal Restoration and Repair, Apr. 26, 2006, p. 1.*
(Continued)

*Primary Examiner* — Duane Smith
*Assistant Examiner* — Cabrena Holecek
(74) *Attorney, Agent, or Firm* — Dowell & Dowell, PC

(57) ABSTRACT

The invention relates to an apparatus and a method for handling gases, the apparatus comprising an inlet gas duct (2) leading said gas to a bubbling tank (21), and a gas buffer drum (3) opening into the tank (21) via perforations formed on a plate (3a) of the drum (3), and a suction duct (5) submerged in gas handling liquid (7) situated in the tank (21), and having a gas outlet duct (8) connected into the gas room (3b) of the tank (21). Said perforations formed on the plate (3a) of the drum (3) are shaped as nozzles (4) having a blow direction (J) inclined by an acute angle relating to the plate (3a). The apparatus further comprising a valve (31) for draining the liquid (7) and a turbine house (22) divided into two chambers (22a,22b) by a plate (27), the first chamber (22a) housing an air turbine (43) driven by a liquid turbine (23) housed in the second chamber (22b) and operated by a liquid jet nozzle (26). The first chamber (22a) is connected to the tank (21) by means of the gas outlet duct (8), and the suction duct (5) is connected to the liquid jet nozzle (26) via pump (29a), and the second chamber (22b) is connected to the tank (21).

17 Claims, 10 Drawing Sheets

(56) References Cited

U.S. PATENT DOCUMENTS

| | | | |
|---|---|---|---|
| 6,102,054 A * | 8/2000 | Diaz | 134/57 R |
| 8,597,507 B2 * | 12/2013 | Korzeniowski | 210/188 |
| 2006/0213446 A1 * | 9/2006 | Atlas et al. | 118/726 |
| 2007/0062869 A1 * | 3/2007 | Yamasaki et al. | 210/620 |

FOREIGN PATENT DOCUMENTS

| | | |
|---|---|---|
| GB | 1447711 | 10/1976 |
| JP | 55043353 | 3/1980 |
| JP | 57120087 | 7/1982 |
| JP | 4244590 | 9/1992 |
| JP | 8110179 | 4/1996 |

OTHER PUBLICATIONS

Alvin products date.*
Merriam-Webster definition of several.*
Alvin products, Metal Restoration and Repair, p. 1, Apr. 26, 2006.*
Alvin products internet publication date via Google, Dec. 23, 2013.*
Merriam-Webster definition of "several", Dec. 20, 2013.*

* cited by examiner

METHOD AND APPARATUS FOR HANDLING GASES

The invention relates to an apparatus and a method for handling gases, the apparatus comprising an inlet gas duct leading said gas to a bubbling tank, and a gas buffer drum opening into the tank via perforations formed on a plate of the drum, and a suction duct submerged in gas handling liquid situated in the tank, and having a gas outlet duct connected into the gas room of the tank. The method according to the invention comprises the steps of conducting the gas into the bubbling tank and bubbling said gas into the gas handling liquid through perforations arranged on the plate of the gas buffer drum opening into said gas handling tank, draining said gas handling liquid, and evacuate said gas via an outlet conduct from the gas room of the bubbling tank.

BACKGROUND ART

Without adequate handling the exhaust gases from firing units of heating systems have substantial remaining heat content and contaminations polluting the environment resulting in an undesired environmental contamination, and in a serious heat loss of the heating system. Several solutions have been proposed to reduce this losses. Such a solution is the application of a condensation unit used in heating systems operated by natural gas, in which unit the steam content of the exhaust gas becomes condensed and heat recuperated by condensation can be recycled by means of a heat exchanger.

Solutions are also known comprising conducting, actually bubbling the exhaust gas through a liquid with lower temperature than gas has, thus a large part of the heat and contaminant content of the gas remains in the liquid.

Such a solution is known in the patent application JP 57120087, where the exhaust gas produced by a firing system is conducted into the lower part of a tank filled with liquid, the gas is pumped continuously from the higher part of the tank, that is the gas will be bubbled through the liquid, while a portion of the heat content of the gas remains in the liquid. A further solution disclosed in the Patent publication JP 4244590A can be considered as an improvement of above solution, in that a liquid is sprayed into the gas room above the liquid by means of nozzles resulting in a further heat recuperating and gas scrubbing effect, while the patent application GB 1447711A discloses the use of more than one liquid based on a similar operating principle. A further similar solution is disclosed in the patent publication DE 102 38 229A1. Such solutions use several but at least two electric pumps to establish a pressure difference required in the one hand for bubbling the gas and to circulate the heat exchange liquid in the other hand.

However, several problems arise in the practice of known bubbling treatment solutions of exhaust gases mentioned above, the most important of which are the existence of limits in exploiting heat contained in the exhaust gases and filtering the solid, liquid and gas contaminations carried by the gases, both becoming more and more important in view of protection of the environment.

When bubbling high temperature gases through a mass of liquid the liquid content of the gas stream increases substantially if the temperature of the liquid reaches a temperature about 40° C. (e.g. in case of water as liquid, the steam content of the gas). This excessive formation rate of steam delimits the accessible temperature of the heat receiving liquid, since a substantial part of heat energy introduced into the liquid by the gas discharges the heat exchanger as steam, in the one hand, and in the other hand the mass of liquid losing its volume requires continuous supply. The problem cannot be solved by connecting in series of several bubbling heat exchanger units, since though the subsequent bubbling unit will separate the steam developed, but the temperature of the liquid in the heat exchanger shortly becomes as high as in the preceding tank because of the great amount of heat of the steam, thus a steam development of great extent experienced also in that tank.

Our experiments showed that above solutions according to the state of the art cannot improve substantially the efficiency of heat recovery, since these devices are heated up shortly above said critical temperature and most of the heat content of the flue gas leaves as steam. In addition, their production and operating costs are considerable, firstly because of the auxiliary devices (e.g. electric pumps) applied.

In the field of filtration technique there are several devices known for filtering contaminants in the form of gases, solids and liquids of the exhaust gases. these devices generally use solid filters, but the efficiency of these filters continuously decreases because of its rapid impregnation with contaminants and cleaning the filter is a high costs incurring and complex procedure. In many cases only a complete change of the filter results in the restoration of the adequate cleaning effect.

Other substantial solution in the field of filtering is the electrostatic filtration. Known electrostatic filters, having even huge effectiveness, cannot filter all substances and are very expensive to build and use.

The bubbling process described above also has filtering possibilities of high account. However, the methods/devices of the prior art above can filter flue gases originating from firing gases, exclusively. In case of any flue gas containing solid material the devices applying solutions according to the prior art, like even bubbling, get clogged shortly, thus becoming useless these solutions cannot or almost cannot filter the solids contained in the flue gas.

Operation of devices absorbing gases (absorbers) also shows disadvantages. In many cases, these devices apply bubbling processes bubbling the gases to be absorbed vertically into the absorbent liquid by means of turbines or compressors of great power demand, thus these processes are expensive and have less efficiency because of bubbling vertically.

Considering further different filtering techniques, like atomizing scrubbers, packed absorbers, curling and rotating scrubbers, plate towers, Venturi scrubbers, it might be stated that applying/siting these devices is very expensive and/or delimited because of clogging of the filters, big sizes due to a low efficiency and/or cleaning, and/or power demand of these processes.

Therefore, the object of the invention is to overcome the disadvantages of the solutions mentioned above, providing a method and an apparatus adapted to recover the usable heat content of vapours/gases and flue gases by means of heat exchange between vapours/gases/flue gases and a heat exchange liquid at low costs and high efficiency, and in the same time to remove solids, liquids and gases from the flue gases of the firing equipment otherwise contaminating the environment, while avoiding deposition of carbon black, tar and other contaminants on the wall of the device during bubbling.

It is also an object of the present invention to enhance the efficiency of absorption of gases in liquids.

Furthermore, the object of the present invention to provide a suction effect necessary to bubbling by means of a simple, reliable solution of low power demand and noise level.

DISCLOSURE OF THE INVENTION

The object of the invention is achieved by providing an apparatus and a method for handling gases, comprising a gas inlet duct leading said gas to a bubbling tank, and a gas buffer drum opening into the tank via perforations formed on a plate of the drum, and a suction duct submerged in gas handling liquid situated in the tank, and having a gas outlet duct connected into the gas room of the tank. The perforations formed on the plate of the drum are shaped as nozzles having a blow direction inclined by an acute angle to the plate, the apparatus further comprising a valve for draining the liquid, and said gas inlet duct is connected to the gas buffer drum, and the apparatus comprises a turbine house divided into two chambers by a plate, the first chamber housing an air turbine driven by a liquid turbine housed in the second chamber and operated by a liquid jet nozzle, and the first chamber is connected to the tank by means of the gas outlet duct, and the suction duct is connected to the liquid jet nozzle via a pump, and the second chamber is connected to the tank.

Advantageously, several nozzles having a blow direction inclined by an acute angle to the plate are arranged along a periphery of at least one circle drawn on the plate of the drum.

The blow direction vector of each nozzle extends substantially in the direction of a subsequent nozzle and it is in a plane crossing the local tangent of said circle and being perpendicular to the plate of the drum, or said direction vector extends in the direction between the subsequent nozzle and a nozzle situated in an adjacent circle.

Said nozzles are arranged on the plate along concentric circles and spaced apart by equal distances from each other.

Said air turbine and said liquid operated turbine are attached by means of a bearing axle.

Said air turbine and said liquid turbine are attached by means of a sliding bearing axle, the sliding bearing of which is formed by high pressure gas handling liquid streaming between said liquid turbine and a shell.

The plate and the drum are made of heat insulating material and/or provided by a heat insulating coating comprising preferably bitumen and/or silicone.

The apparatus is provided with a heat utilizing unit.

The gas outlet duct is conducted through at least one cooling block fed by a coolant from external source, and the cooling block is fluidly connected to a coolant buffer vessel connected to the tank by means of a control valve.

The second chamber comprises the inner gas room of the tank, and the plate is a wall of the tank, and The gas handling liquid comprises water.

To achieve the object of the present invention a method for handling gases is provided, comprising the steps of: leading said gas to a bubbling tank, bubbling said gas into a gas handling liquid through perforations formed on a plate of a gas buffer drum, draining off said gas handling liquid, and sucking said gas by means of a gas outlet duct connected into a gas room of the tank, and bubbling said gas into the handling liquid, then the gas room of the tank through nozzles formed on the plate of the drum and having a blow direction inclined by an acute angle to the plate, and sucking said gas from the gas room of the tank by means of an air turbine housed in a first chamber of a turbine house and driven by a liquid turbine housed in a second chamber of said turbine house divided into said two chambers by a plate, while operating the air turbine by means of said liquid turbine in such a way, that pumping said gas handling liquid drained off from the tank onto a jet nozzle driving said liquid turbine and then leading said gas handling liquid back to the tank.

The method according to the invention comprises the step of bubbling said gas into the handling liquid, then the gas room of the tank through several nozzles having a blow direction inclined by an acute angle to the plate and arranged along a periphery of at least one circle drawn on the plate of the drum.

Blow direction vector of each nozzle preferably extends substantially in the direction of a subsequent nozzle in a plane crossing the local tangent of said circle and being perpendicular to the plate of the drum, or the blow direction vector extends in the direction being between the subsequent nozzle and a nozzle situated in an adjacent circle, and arranging said nozzles on the plate along concentric circles, and spaced apart by equal distances from each other.

According to the method a plate and a drum made of heat insulating material and/or provided by a heat insulating coating comprising preferably bitumen and/or silicone are used.

Preferably the gas outlet duct is conducted through at least one cooling block fed by a coolant from external source, and fluidly connecting the cooling block to a coolant buffer vessel opening to the tank by means of a control valve, and circulating said gas handling liquid through a heat utilizing unit or a heat exchanger.

BRIEF DESCRIPTION OF THE DRAWINGS

The invention will be described in details by preferred embodiments referring to the drawings attached. In the drawings.

DETAILED DESCRIPTION OF A PREFERRED EMBODIMENT OF THE INVENTION

Figure 1:
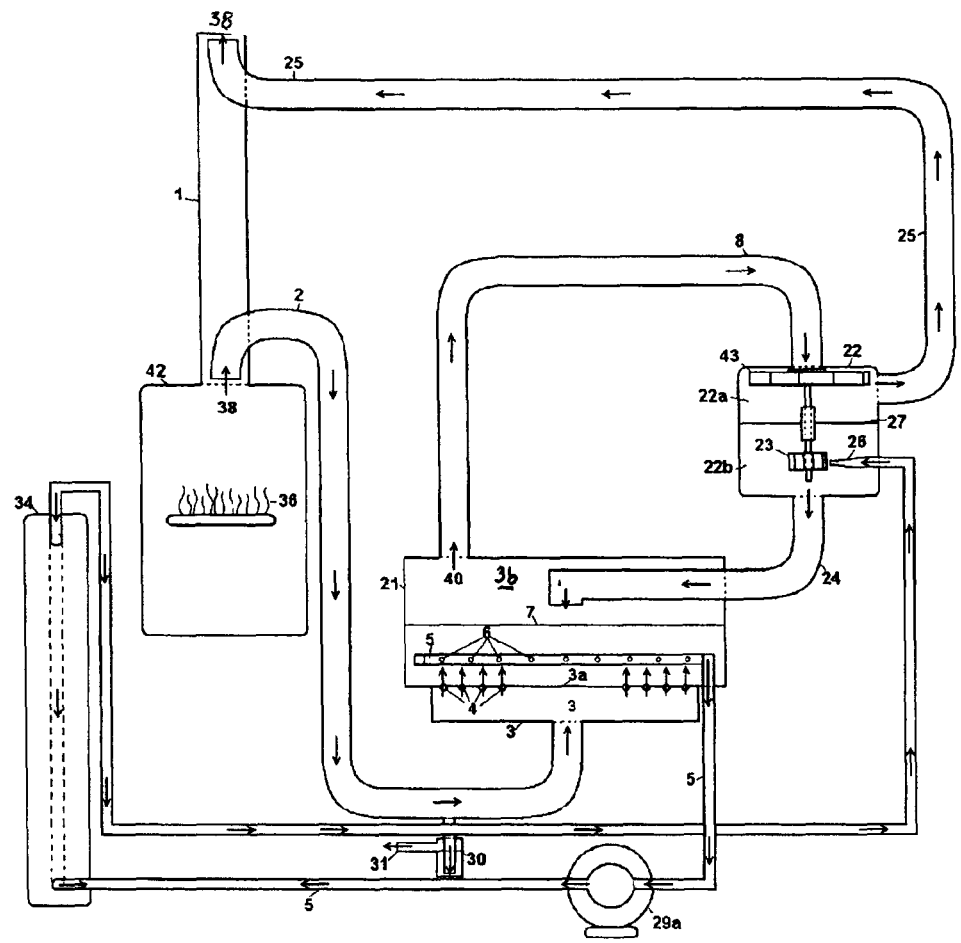
FIG. 1. diagrammatically shows a preferred embodiment of the apparatus according to the invention, FIG. 2. top view of the bubbling plate of the apparatus according to the invention, with nozzles arranged along six concentric circles, FIG. 3. cross sectional view of a nozzle along line A-A of FIG. 2, FIG. 4. cross sectional view of a nozzle along line B-B of FIG. 3, FIG. 5. side view of the air turbine driven by a liquid turbine and a jet nozzle used in the apparatus according to the invention, FIG. 6. top view of the air turbine driven by a liquid turbine and a jet nozzle shown in FIG. 5, FIG. 7. perspective view of bubbling nozzle shown in FIGS. 3. and 4, FIG. 8. a further preferred embodiment of the apparatus according to the invention, wherein the second chamber comprises the inner gas room of the tank, and the heat utilizing unit comprises a heat exchanger, and the apparatus is provided by a condensing heat exchanger, FIG. 9. a further preferred embodiment of the apparatus according to the invention, wherein the heat utilizing unit comprises a radiator, and the second chamber of the turbine house comprises the bubbling tank, FIG. 10. shows a further preferred embodiment of the apparatus according to the invention, wherein in the turbine house two separating plate define the firs chamber therebetween and the second chamber above and beneath the plates, FIG. 11. depicts a further preferred embodiment of the apparatus according to the invention adapted for removing gas/solid/liquid state contaminants from gases, without recovering the heat content of the gas, and FIG. 12. a preferred embodiment of the apparatus according to the invention adapted for air heating.
Figure 11:
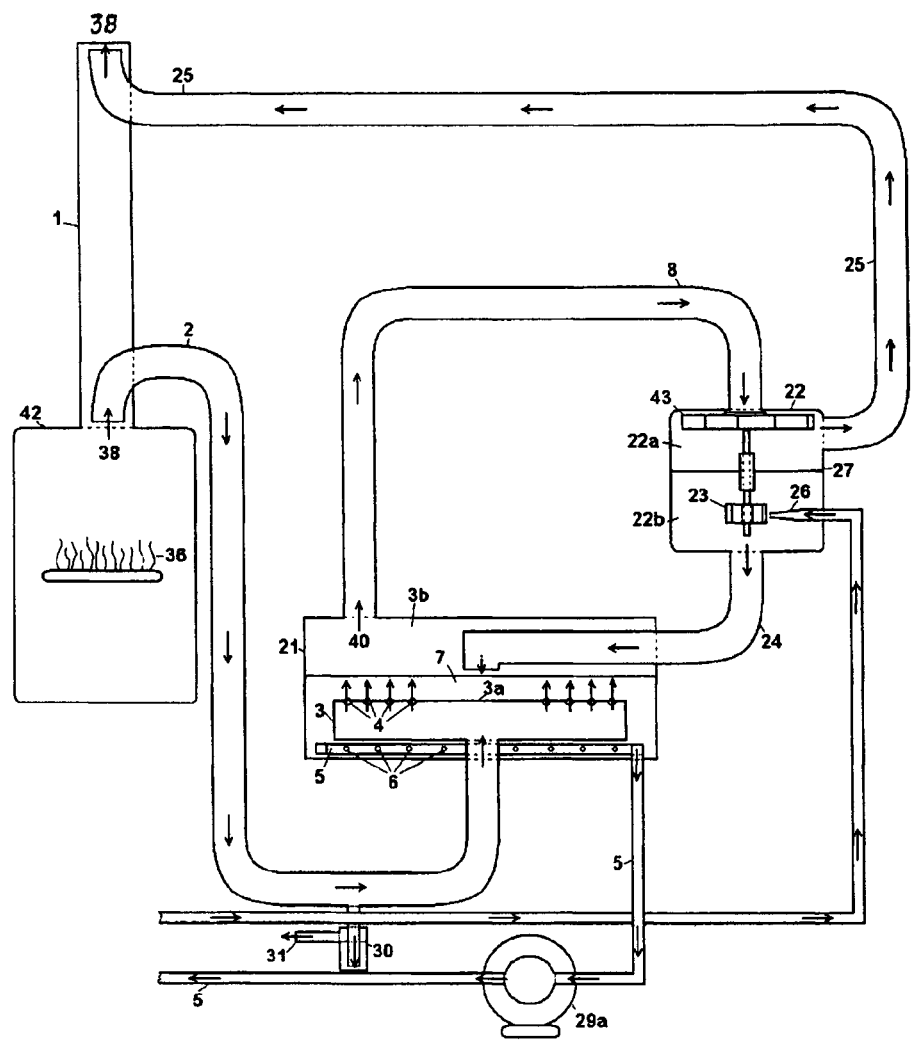

In FIG. 1. a preferred embodiment of the apparatus for handling gases according to the invention is shown. The apparatus adapted for removing contaminants in form of gases, solids and liquids of gases, efficient and reliable recovering heat content of gases, e.g. flue gases in this embodiment, and utilizing heat derived from exothermic processes taking place along with gas generation and/or absorption. It can be seen in the FIG. 1, that in this embodiment the gas handling apparatus is provided by a heat utilizing loop containing a heat utilizing unit 34, e.g. a radiator. However, the apparatus according to the invention is even adopted for increasing operational efficiency of all type thermal systems and/or filtering-by-liquid and/or absorbing devices, which treat gases, exhaust gases and/or streams or such substances are generated (FIG. 11). The apparatus according to the invention comprises a gas inlet duct 2 leading said gas 38 to a bubbling tank 21, and also comprises an outlet duct 25. A gas buffer drum 3 opening into the tank 21—from beneath in this embodiment—has a plate 3a preferably forming the bottom of the tank 21, but all the drum 3 can be situated inside the tank 21, as it can be seen in FIGS. 8. and 9. On the plate 3a of the drum 3 perforations are shaped as at least one, but preferably several nozzle(s) 4 having a blow direction J inclined by an acute angle α to the plate 3a. Blow direction J vector of each nozzle 4 extends substantially in the direction of a subsequent nozzle 4 and it is in a plane crossing the local tangent of said circle and being perpendicular to the plate 3a of the drum (3). It is preferred that said vector extends in the direction between the subsequent nozzle 4 and a nozzle 4 situated in an adjacent circle. By this arrangement exhaust gases 38 streaming out of nozzles 4 and disrupting into bubbles create a whirl in the gas handling liquid 7 situated in tank 21, the level of which is above the plate 3a. The curled path of the gas 38 bubbles up to the surface of the liquid 7 in the whirl is longer than a straight line, therefore, the time period of the heat exchange and/or filtering/absorption will be increased. Bubbles scattered in such a way contact by greater surface the gas handling liquid 7 than gas spheres forming a line of bubbles ascending vertically.

Figure 10:
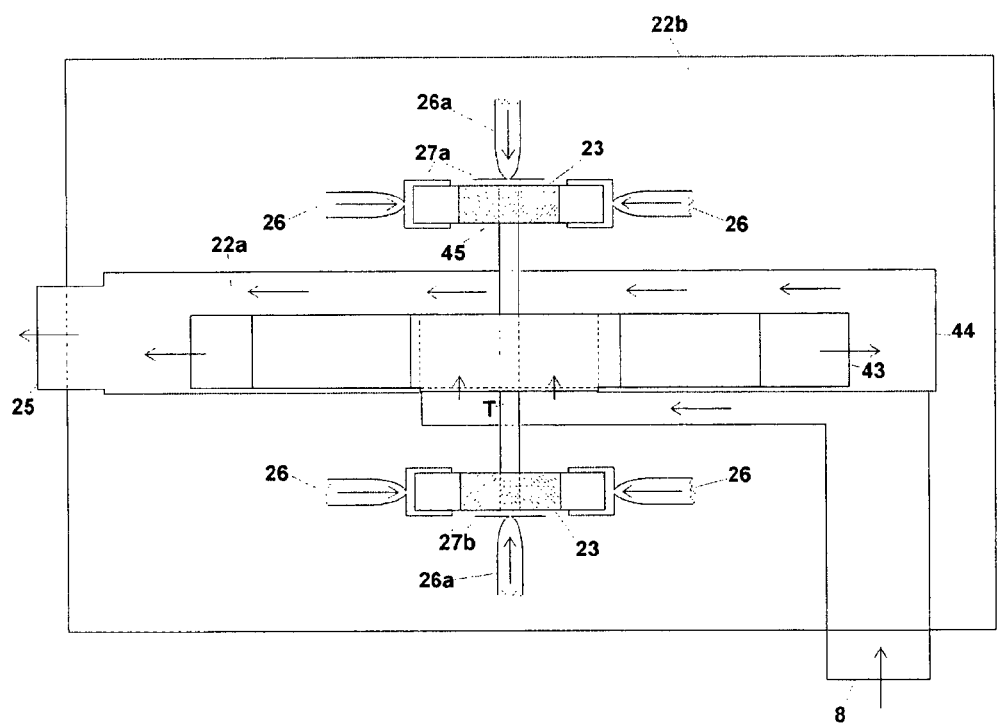

A suction duct 5 submerged in gas handling liquid 7 is situated in the tank 21, as it is depicted in FIG. 1. Holes 6 having preferably opposite direction as compared the blow direction J of nozzles 4 are formed on the suction duct 5, thus enhancing also the spinning of the liquid 7 discharging into the suction duct 5 through the holes 6. Suction duct 5 is connected to a circulating pump 29a discharging the gas handling liquid, and the heat content of the liquid 7 can be used in a heat utilizing unit 34, then the liquid is fed into a liquid jet nozzle 26 housed in a second chamber 22b of a turbine house 22 divided into a first chamber 22a and a second chamber 22b by a plate 27. The first chamber of the turbine house 22 houses an air turbine 43 driven by a liquid turbine 23 housed in the second chamber 22b and operated by said liquid jet nozzle 26 also housed in the second chamber 22b. The air turbine 43 and said liquid turbine 23 are attached to each other e.g. by means of a bearing axle T journaled in the plate 27, or the turbine house 22 are separated into two chambers 22a, 22b by a shell 44 comprising two plates 27, so that the chamber 22a is formed between plates 27 and the chamber 22b is formed above and beneath the shell comprising the plates 27 (FIG. 10.). In a preferred embodiment the turbine house 22 can be arranged wholly in the gas room 3b of the tank 21, when the gas room 3b comprises the chamber 22b and the tank 21 itself comprises the turbine house 22. In the chamber 22b, liquid turbines 23 are arranged on both ends of the axle T, and an air turbine 43 is arranged in the chamber 22a, which are connected to each other by means of the axle T passing through the plates 27. In this embodiment shown in FIG. 10. the axle T passing through the delimiting plates 27 is journaled not in the plates 27, but the liquid turbines 23 are received in a shell 27a. Openings are formed on the shell 27a for the jet nozzles 26, 26a and for the axle T, respectively. Jet nozzle 26a is placed on the side of the liquid turbine opposite the axle T and aligned with the axle T. During operation liquid 7 streaming out the jet nozzles 26, 26a forms a high pressure liquid 7 film in a gap 27b being between the shell 27a and the liquid turbine 23, which journals the liquid turbine 23 on the axle T as a sliding bearing, while the gas handling liquid 7 streaming out the jet nozzle 26 drives the liquid turbine 23. Liquid 7 leaves the shell 27a through e.g. an opening 45 beside the axle T.

Gas treating liquid 7 circulated by pump 29a and exiting from jet nozzle 26 drives the liquid turbine 23 driving the air turbine 43 by means of axle T. Air turbine 43 creates a suction effect through duct 8 connected to the tank 21, which effect is necessary to transfer the gas 38 along duct 8 and to suck it through liquid 7, since the first chamber 22a is connected to duct 8 exiting tank 21 via opening 40. As it can be well observed in the figure, expensive and noisy electric motors to transfer and suck the gas 38 may be eliminated, because this aim can easily be achieved by means of the pump 29a and air turbine 43.

Figure 8:
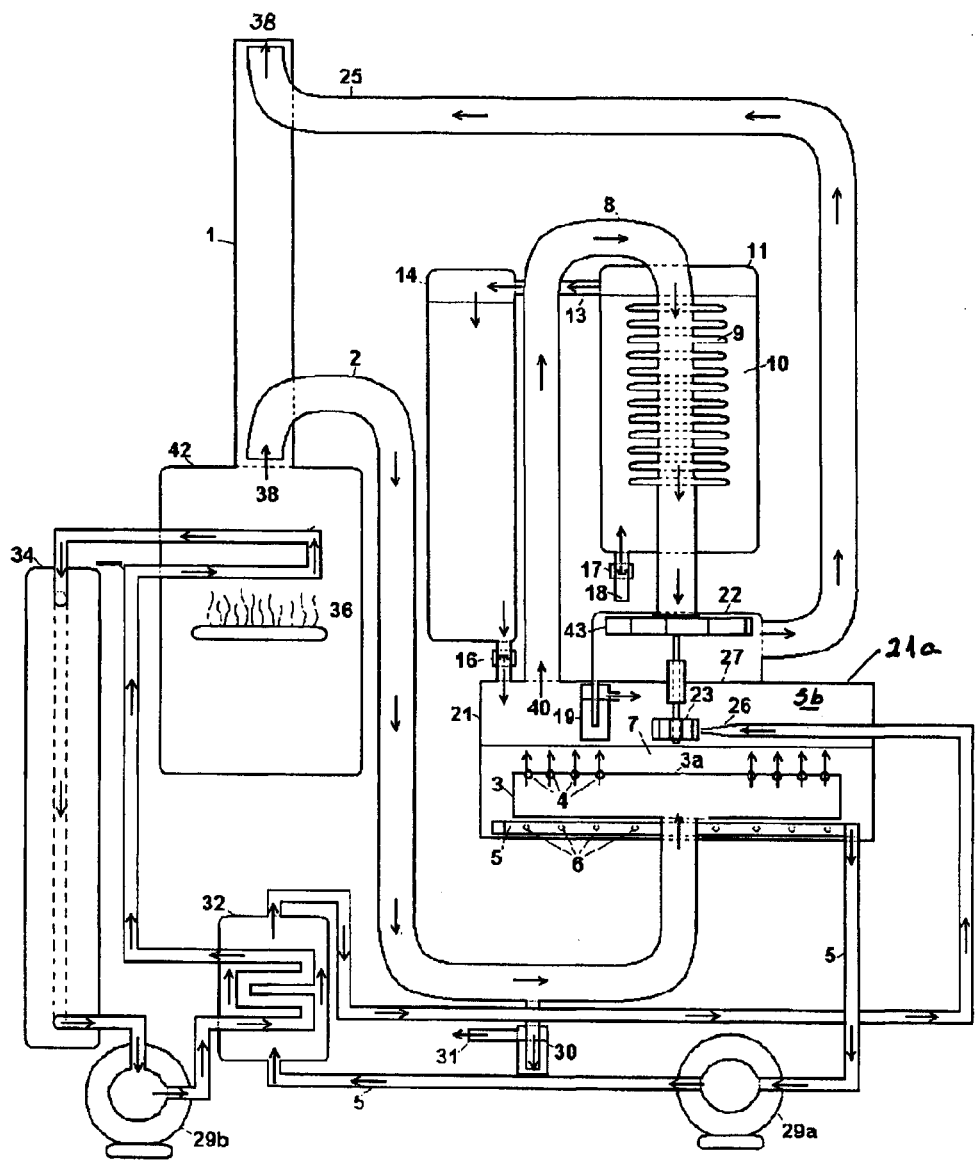

Moisture content of the gas 38 in duct 8 becomes partly condensed, and preferably turns back to the tank 21 via a duct and trap 19 (shown in FIG. 8,9,12). From chamber 22b the gas treating liquid 7 enters the tank 21 via duct 24. At its lowermost point duct 8 is provided by a siphonal 30 draining pipe 31, by which the contaminated water, displaced by the liquid overflowed in cooling block 11 and accumulated condensate, can be removed, if the pressure difference between the gas buffer drum 3 and tank 21 created by operational sucking effect released. In case of exploiting exhaust gases, exhausts in contaminated liquid do not pollute the environment uncontrollably, but they can be treated by adequate processes well known by the person skilled in the art.

Figure 2:
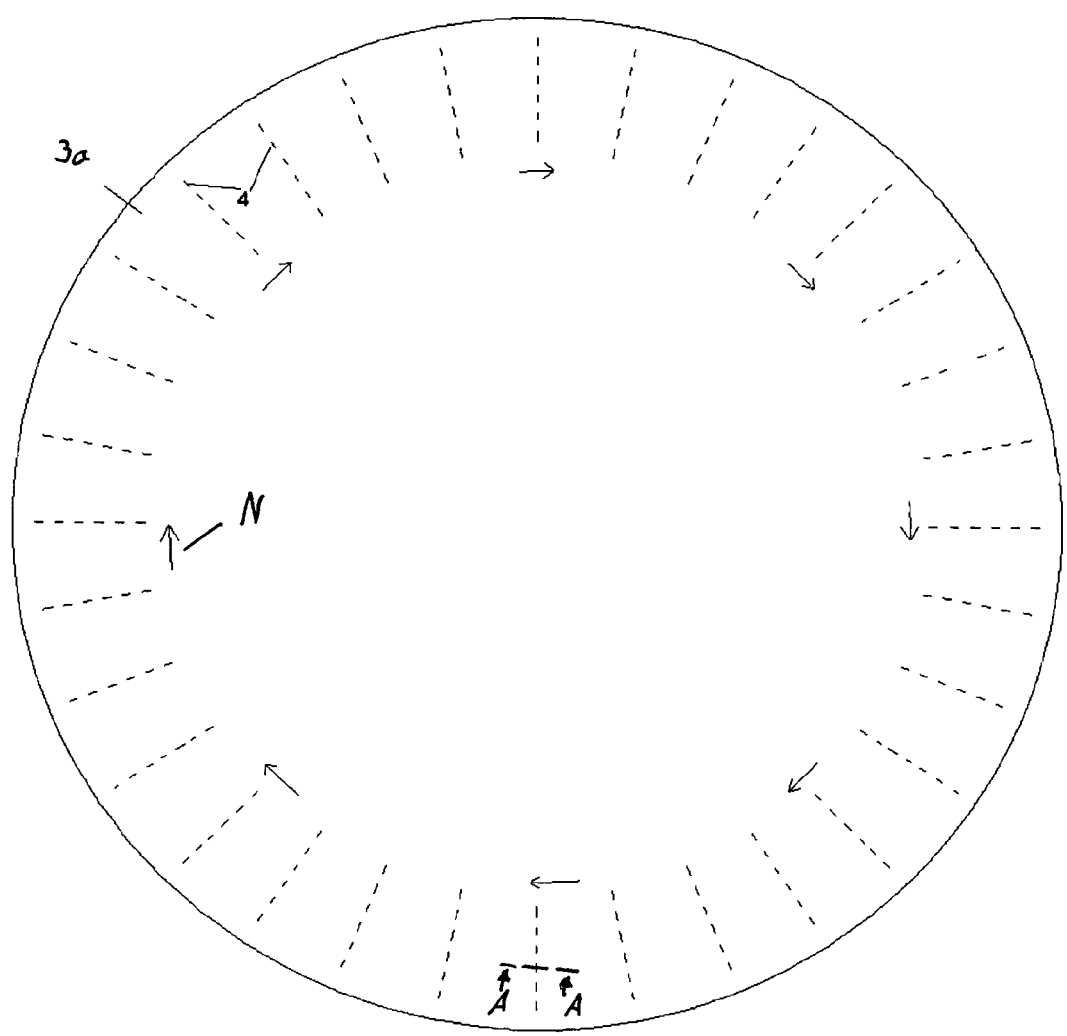

FIG. 2. is a top view of the bubbling plate 3a delimiting from the top the gas buffer drum of the apparatus according to the invention, with nozzles 4 arranged thereon. Gas 38 is flowed into the gas treating liquid 7 placed around the drum 3 and above the plate 3a through the plate 3a having nozzles 4 in a direction depicted by arrows N with an sufficiently high velocity, thus creating a curling movement in the liquid 7 by means of bubbles. In case of a flue gas stream of approximately 20 m³/h and with total cross sectional area of 2000-3000 mm² of the nozzles 4 i.e. with a streaming velocity of 1.87-2.8 m/s (see example) the stream conditions are sufficient. For a stream velocity of less than 1.87 m/s the whirl is too slow, that is the efficiency is decreased, but with a stream velocity above 2.8 m/s the bubbles agglomerate and the huge bubbles thus created dash the gas treating liquid 7. During streaming achieved above the perforated plate 3a a further vacuum will be created behind the nozzles 4, decreasing production costs of pressure difference being necessary for establishing a bubbling process, moreover, the shearing effect acting to the bubbles decreases the sizes thereof, thus increases efficiency of physical/chemical processes taking place during bubbling. In the preferred embodiment shown in FIG. 2 nozzles 4 are arranged along concentric circles drawn on the plate 3a of the drum 3. Direction of whirling movement is depicted by arrows N. The plate 3a can be formed in a form other than circle, like square, rectangle or polygon, according to the actual shape of the gas buffer drum 3, and nozzles 4 can be arranged along a curve other than circle or randomly.

Figure 3:
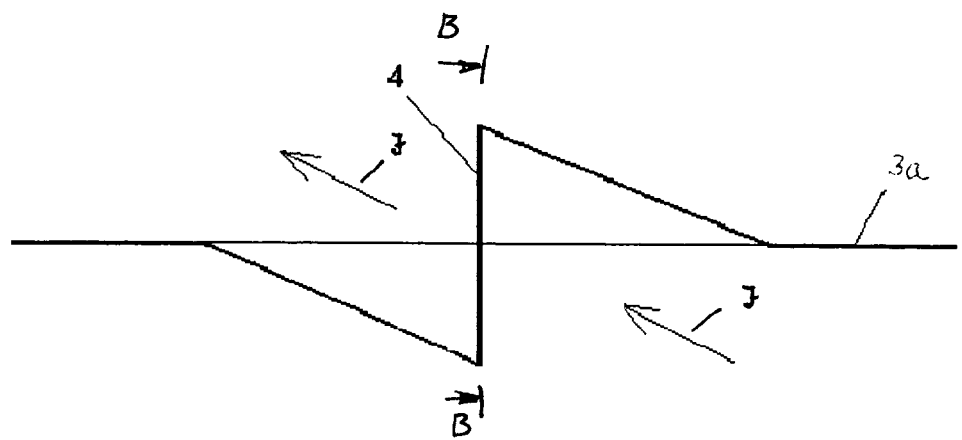

FIG. 3 is a cross sectional view of a nozzle along line A-A of FIG. 2. Nozzle 4 is shaped preferably in such a way that a duct is formed between its upper wall 4a and lower wall 4b, which is inclined by an acute angle α to the surface of the plate 3a, thus a blow direction J of the nozzle 4 inclines also by that acute angle α to the plate 3a.

Figure 4:
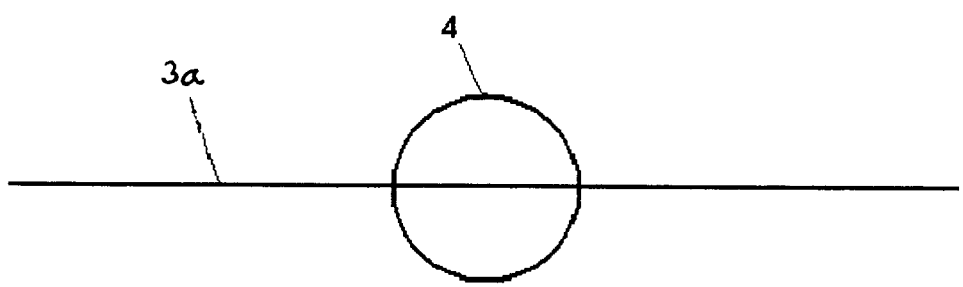

FIG. 4 is a cross sectional view of a nozzle along line B-B of FIG. 3. The nozzle 4 has a round shape, e.g. a circle, as it can be seen also in FIG. 7. It has been found, that this shape enhances less bubbles to evolve as well as a fast break-away of bubbles, which increases the heat exchange/filtering/absorbing surface between gas 38 and the liquid 7, and prevents nozzle 4 from choking.

With bubbling flue gases 38 resulted from firing non gaseous combustibles in prior art apparatuses, excessive deposition of carbon black, tar and other contaminants occurs on both (hot and cold) sides of the plate 3a because of the huge temperature difference existing between the flue gas having many hundred ° C. and the heat exchange liquid 7 placed on the other side of the bubbling plate 3a and having far lower temperature. Due to depositions the openings used for bubbling become occluded and heat exchange ceases. Therefore, according to the invention, the surfaces of the gas buffer drum 3 and the upper plate 3a shall be provided by a heat insulating coating, if desired, which advantageously consists of a bitumen based dye or preferably a silicone rubber coating. Tar and carbon black peel off adequately from these type of coatings or even do not deposit. Thus the heat exchange in the tank 21 occurs exclusively between the gas 38 bubbles and the liquid 7. Flue gas 38 (steam/gas) exits through the outlet duct 8 connected to the gas room 3b of the bubbling tank 21.

Figure 5:
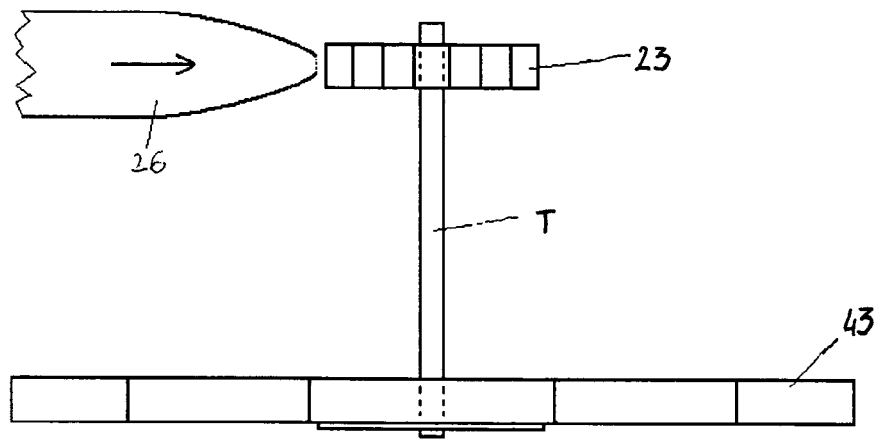
Figure 6:
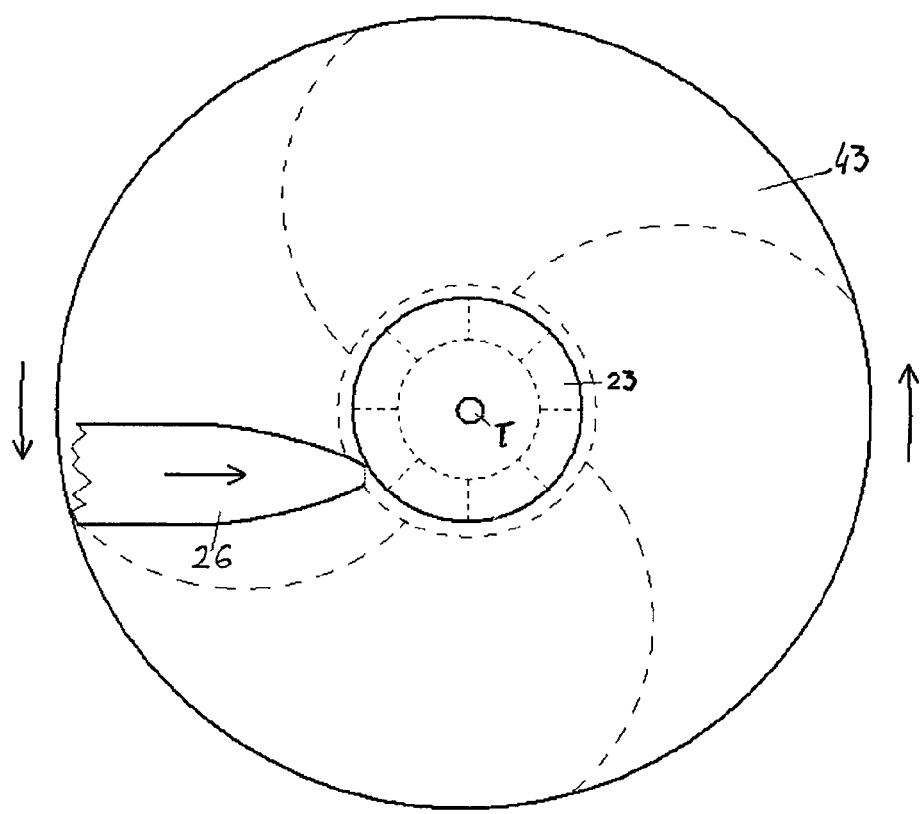

In FIGS. 5 and 6 it can be seen, that the gas treating liquid 7 circulated by pump 29a and entering the jet nozzle 26 drives the liquid turbine 23, which in turn actuates the air turbine 43 by means of the axle T. Thus the air turbine 43 creates the sucking effect required to conduct the gas/steam/flue gas 38 in duct 8 and to suck that gas 38 through the gas treating liquid 7, since the first chamber 22a is connected into the duct 8 exiting the tank 21. As it is seen well in the figures, it is no longer required a noisy and expensive electric motor to transfer and suck through the gas 38, because the aim can be solved by the pump 29a and air turbine 43 disclosed above.

Gas treating liquid 7 exiting turbine house 22 drains back to the tank 21 via duct 24 of the second chamber 24a. A portion of the contaminated liquid 7 is removed and diluted if necessary.

Figure 7:
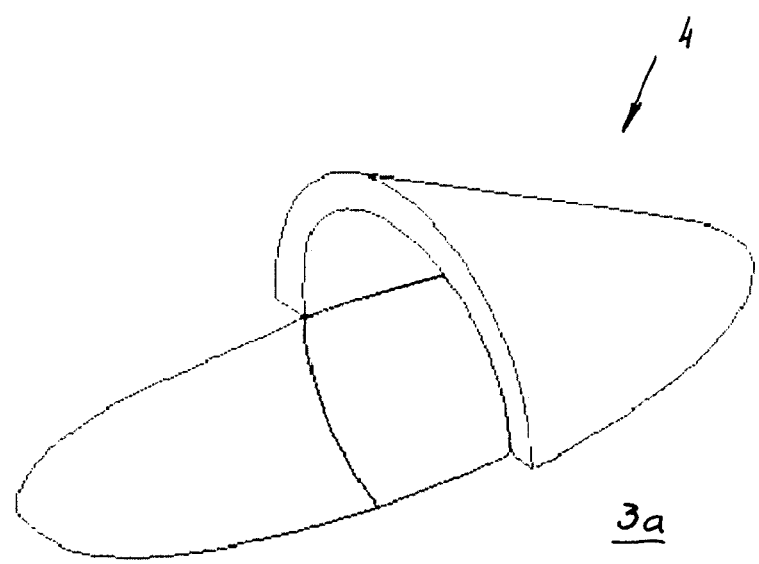

As stated above, a bubbling nozzle 4 is provided according to the present invention and shown in FIG. 7, by which the gas 38 bubbled makes the gas handling liquid 7 whirled resulted in an efficient heat change/filtering/absorption during direct contact taking place in a prolonged period of time, further, the surfaces of the bubbling plate 3a and the drum 3 are provided by a coating with increased heat insulation and precipitation resistant properties or made of materials having such properties, increasing the efficiency if bubbling and inhibiting the formation of precipitations.

In a preferred embodiment shown in FIG. 8 adapted to exploit heat content of hot flue gases 38 the mixture of flue gas and steam exiting tank 21 via duct 8 does not enter directly the turbine house 22, but first enter a cooling block 11, preferably at the upper part thereof, arranged between the tank 21 and turbine house 22 and along the duct 8, in which a large portion of the heat content remained in the mixture will be transferred into a coolant 10, preferably water, circulating in the cooling block 11. The most of steam contained in the flue gas 38 will be condensed and returns to the tank 21 via siphon 19 and duct, while the temperature of the coolant 10 (e.g. water) circulating in the secondary circuit of the cooling block 11 increases up to the temperature of the steam. Coolant 10 having increased temperature drains into a buffer 14 via spillway 13, while its volume is eked out preferably with water by a water supply connection 18. Buffer tank 14 is connected to the bubbling tank 21 via valve 16 draining the coolant 10 with high temperature into the tank 21 by a controlled way. Accordingly, the quantity of water entering the secondary circuit of the cooling block 11 by controlling valve 17 is enough to eke out the loss of the gas handling liquid 7. In such a way one can control/maintain the level of liquid 7 in the tank 21 by means of a control device (not shown in the figure) well known to the person skilled in the art, if the control device controls the volume of the water entering at valve 17 as a function of changes of level of gas handling liquid 7. In addition, a further role of the buffer tank 14 is to store the coolant 10 heated in the cooling block 11 by the flue gas/steam mixture during time periods of operational breaks of the firing device 42 as well as the apparatus according to the invention operated periodically, up to the restart thereof.

Figure 12:
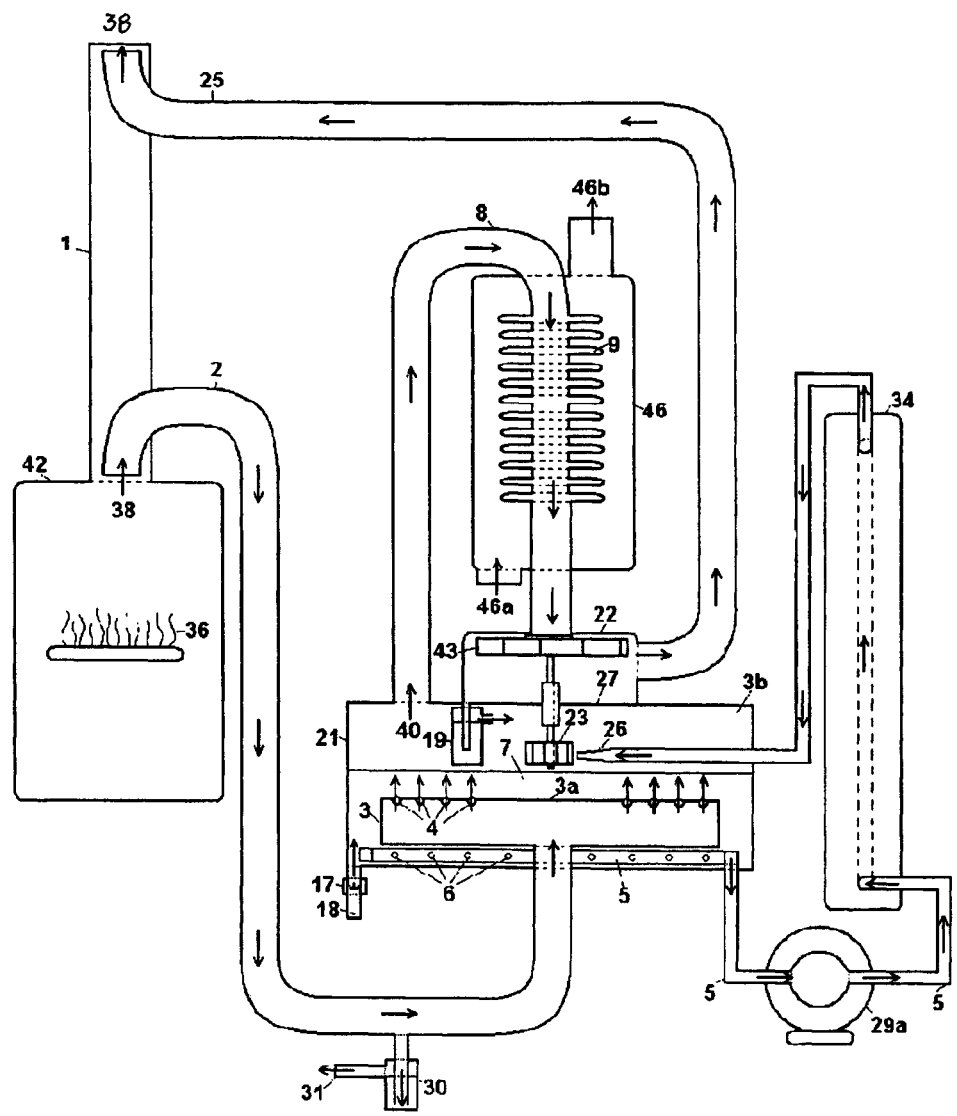

In a preferred embodiment shown in FIG. 12 the secondary circuit of the cooling block is fed by combustion air of the firing equipment 42 instead of coolant 10, before the air enters the combustion chamber 36 of the firing equipment 42. In this embodiment the cooling block is a gas-gas heat exchanger 46, and entering air is referenced by the number 46a and exiting air by 46b. The apparatus of this form is adapted i.e. to operate as a hot-air heater heating directly the air of a room to be heated or to pre-heat the combustion air. In this embodiment the water supply connection 18 and the control valve 17 are arranged at the bottom of the tank 21.

Before starting the apparatus for the first time the buffer tank 14 is empty. Coolant 10 enters the bubbling tank 21 by opening of the valves 16 and 17 simultaneously, and the coolant 10 spilling from the cooling block 11 flows through the buffer tank 14, or the buffer tank may be filled by opening the valve 17, then the valve 17 is closed and the coolant 10 enters the tank 21 by opening the valve 16. Then the cold coolant 10 may be streamed into the cooling block 11 through valve 17, the coolant spills into the buffer tank 14 and the preheated warm coolant 10 necessary to start again the apparatus is stored in the buffer 14. Liquid content of the flue gas/steam mixture condensed almost perfectly in the cooling block 11 returns to the bubbling tank 21 via siphon 19 and duct. Thus, in case of e.g. 3-4 liters of gas treating liquid 7 bubbled/circulated in the apparatus, the quantity of liquid 7 increases by 1 l/hour, which dilutes the contaminated liquid 7 possibly drained to sewer after mixing with fresh water. Draining of contaminated gas treating liquid 7 may take place via draining duct 31 connected to a siphon 30. At the time of stopping of the gas handling apparatus according to the invention, and the air turbine 43 stops as well, vacuum established thereof in the tank 21 ceases and consequently the liquid 7 drains back to the flue gas sucking duct 2 via nozzles 4 and gas buffer drum and drains further to the sewer network via draining duct 31 of the siphon 30 arranged at the lowermost point of the duct 2.

Therefore, the heated coolant 10 stored in the secondary circuit of the cooling block 11 can be turned back into the tank 21 at the time of subsequent start of the apparatus, if it is required. By this the almost heat loss free supply of fresh liquid necessary to maintain the level of contamination of gas handling liquid 7 can be solved. Although, only one cooling block 11 is shown in the Figures, in a preferred embodiment of the invention several blocks 11 may be applied one after another along the flue gas outlet duct 8.

It is also shown in FIG. 8, that in a preferred embodiment of the present invention the turbine house 22 is integral with the bubbling tank 21, that is the inner gas room of the tank 21 comprises the second chamber 22b of the turbine house 22, that is the second chamber 22b is the same as the tank 21, and the plate 27 is a wall 21a of the tank 21. This solution involves such an advantage, that the apparatus according to the invention is more compact and has a further reduced noise level and heat loss.

The embodiment of the apparatus shown in FIG. 8 differs from that of FIG. 1 that the heat utilizing unit 34 is an intermediate heat exchanger 32. There is shown in the Figure that the firing equipment 42 is provided by a heat utilizing circuit comprising a further heat utilizing unit, e.g. a radiator, like a boiler operated conventional heating system. Thus a medium circulated in the radiator by means of a pump 29a enters the firing equipment in preheated state.

During a method achieved by the apparatus according to the invention the great bulk of the flue gas 38 coming from firing equipment 42 is lead to the bubbling tank 21 via a flue gas inlet formed on the bottom of the tank 21 and the suction duct 2, directly to the gas buffer drum 3 arranged in the lower part of the tank 21. The gas buffer drum 3 is preferably immersed in the gas treatment liquid 7 placed in the tank 21, and gas 38 enters into the gas handling liquid 7, then the gas room 3b of the tank 21 through nozzles 4 formed on the plate 3a of the drum 3 having a blow direction J inclined by an acute angle α to the plate 3a, then the gas 38 disrupting into bubbles streams up in the direction of the surface of the gas handling liquid 7, transferring the great part of its heat content to the gas handling liquid 7. Because of said inclined blow direction J nozzles 4 formed on the plate 3a create a whirl in the gas handling liquid 7. Whirling extends the residence time of the ascending gas bubbles in the liquid 7, and thus a large part of its heat/solid/liquid/gas contamination content transfers into the gas treatment liquid 7, then exiting the surface of the liquid 7 and a cooled mixture of flue gas and steam exhausts through the suction duct 8.

For the method according to the invention the gas 38 must be passed through the apparatus according to the invention by an adequate pressure difference in order to reduce its heat and contaminant content. This pressure difference is established by means of the air turbine 43 disclosed above.

After the great bulk of residual heat content of the flue gas/steam mixture is rejected, the mixture exits the primary circuit of the cooling block 11 and passes into the turbine house 22 via duct 12 by the sucking effect of the air turbine 43 arranged in the turbine house 22, then discharges through a chimney 1 via outlet conduit 25.

Therefore, the method and apparatus according to the invention preferably use the air turbine 43 shown in FIGS. 5 and 6, operated by the free jet liquid turbine 23 resulted in considerably decreased mass of the rotor and omitting the need of cooling. In order to operate the free jet liquid turbine 23 a pump 29a rotating at substantially less revolutions per minute like an electric drive means can be applied, both the power consumption and operational noise level of which is much lower than an electric motor adapted to drive an air turbine operating at high rotational speed. This solution may also be applied for apparatuses circulating a liquid by means of a device creating high pressure.

Figure 9:
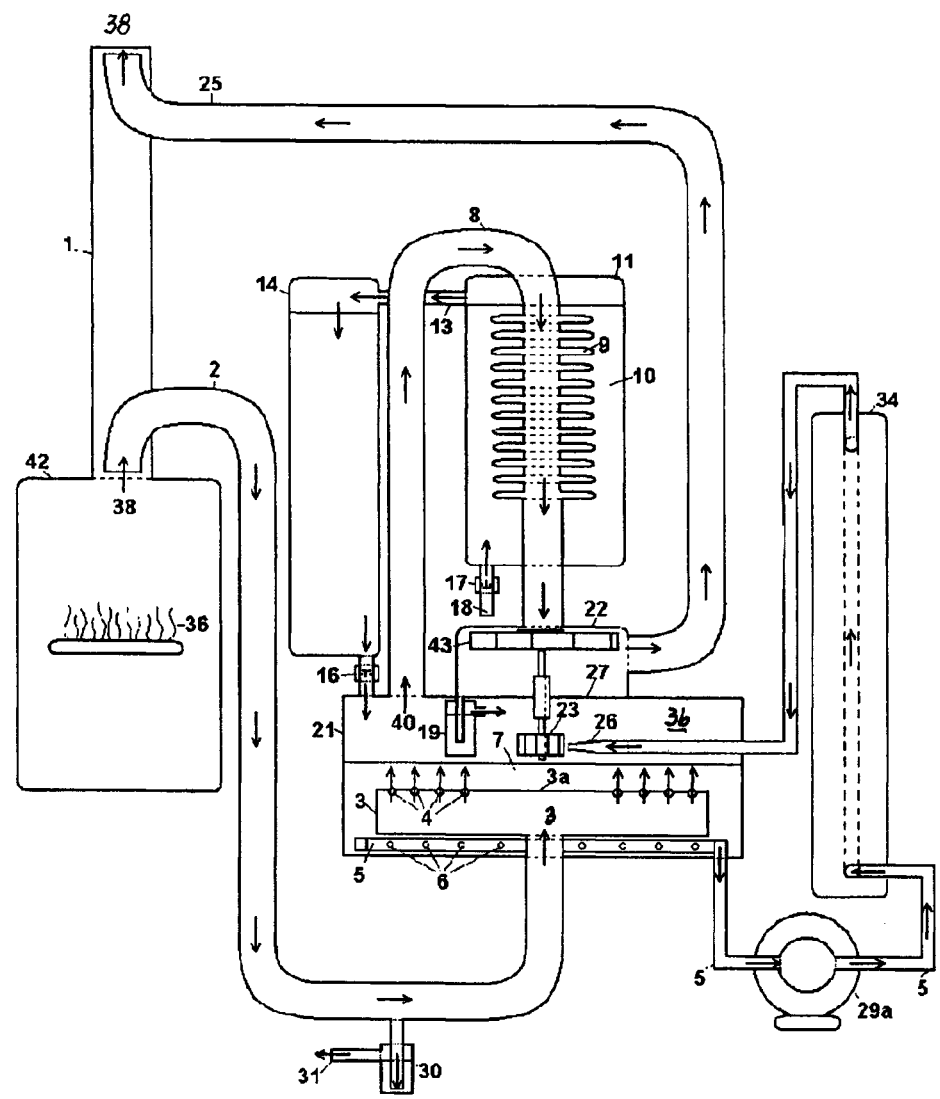

In FIG. 9 a further preferred embodiment of the invention is shown, embodying the most compact apparatus according to the invention by virtue of incorporating the embodiments of FIG. 1 with that of FIG. 8.

In a preferred embodiment shown in FIG. 12 the secondary circuit of the cooling block is fed by combustion air of the firing equipment 42 instead of coolant 10, before the air enters the combustion chamber 36 of the firing equipment 42. In this embodiment the cooling block is a gas-gas heat exchanger 46, and entering air is referenced by the number 46a and exiting air by 46b. The apparatus of this form is adapted i.e. to operate as a hot-air heater heating directly the air of a room to be heated or to pre-heat the combustion air. In this embodiment the water supply connection 18 and the control valve 17 are arranged at the bottom of the tank 21.

In a preferred embodiment of the apparatus according to the invention (not shown in the drawings) a gas-gas heat exchanger is cut in between the turbine house 22 and the cooling block 11. The combustion air entering the firing equipment 42 can lead through this heat exchanger cooling further the gas 38 and condensing its remaining steam content and combustion air entering the firing equipment 42 may be further heated. Naturally, the condensate from this heat exchanger may also be drained back into the tank 21, but its draining is a must, inevitably.

Similar gas-gas heat exchanger can be built before and between cooling blocks 11 in cascade connection in regard of combustion air entering the firing equipment 42, such that the cooling air is circulated from the cooler unit to the warmer one, then into the firing equipment 42.

The apparatus according to the invention makes possible an almost perfect heat recovery, as well as cleaning the flue gases/steams/gases from materials being harmful to the environment, absorbing gases in liquids by high efficiency, and efficient reducing the liquid content of gases as well.

EXAMPLE

Conducting a test of 30 minutes a flue gas was led by 20 m³/h volume of flow into the bubbling tank 21, which then entered the cooling block 11 at a temperature of the gas treatment liquid 7 approximately, namely at 75° C., then flowed into the turbine house 22 at a temperature of 22-25° C. and then discharged. Total nozzle 4 cross section area was 2000-3000 mm², that is the flow pattern seemed to be acceptable with a flow speed of 1.87-2.8 m/s.

Therefore, the principal advantage of the invention is to overcome the disadvantages of the solutions mentioned above, providing a method and an apparatus adapted to recover the usable heat content of vapours/gases and flue gases by means of heat exchange between vapours/gases/flue gases and a heat exchange liquid at low costs and high efficiency, and in the same time to remove solids, liquids and gases from the flue gases of the firing equipment otherwise contaminating the environment, while avoiding deposition of carbon black, tar and other contaminants on the wall of the device during bubbling, and enhancing the efficiency of absorption of gases in liquids, and providing a suction effect necessary to bubbling by means of a simple, reliable solution of low power demand and noise level, and reducing costs due to break down and maintenance, and providing efficient filtering/absorbing processes by low costs.

The invention claimed is:

1. Apparatus for handling gases, the apparatus comprising a gas inlet duct (2) leading a gas (38) to a bubbling tank (21), and a gas buffer drum (3) opening into the tank (21) via perforations formed on a plate (3a) of the gas buffer drum (3), and a suction duct (5) submerged in gas handling liquid (7) situated in the tank (21), and having a gas outlet duct (8) connected into a gas room (3b) of the tank (21), wherein said perforations formed on the plate (3a) of the gas buffer drum (3) are shaped as nozzles (4) having a blow direction (J) inclined by an acute angle α to the plate (3a), the apparatus further comprising a valve (31) for draining the liquid (7), and said gas inlet duct (2) is connected to the gas buffer drum (3), and the apparatus comprises a turbine house (22) divided into first and second chambers (22a,22b) by a plate (27), the first chamber (22a) housing an air turbine (43) driven by a liquid turbine (23) housed in the second chamber (22b) and the liquid turbine is operated by a liquid jet nozzle (26), and the first chamber (22a) is connected to the tank (21) by means of the gas outlet duct (8), and the suction duct (5) is connected to the liquid jet nozzle (26) via a pump (29a), and the second chamber (22b) is connected to the tank (21).

2. Apparatus according to claim 1, the several nozzles (4) having blow direction (J) inclined by the acute angle α to the plate (3a), wherein the several nozzles (4) are arranged along a periphery of at least one circle drawn on the plate (3a) of the gas buffer drum (3).

3. Apparatus according to claim 1, wherein said nozzles (4) are arranged on the plate (3a) along concentric circles and spaced apart by equal distances from each other.

4. Apparatus according to claim 1, wherein said air turbine (43) and said liquid turbine (23) are attached by means of a bearing axle (T).

5. Apparatus according to claim 1, wherein said air turbine (43) and said liquid turbine (23) are attached by means of a sliding bearing axle (T), the sliding bearing of which is formed by high pressure gas handling liquid (7) streaming between said liquid turbine (23) and a shell (27a).

6. Apparatus according to claim 1, wherein the plate (3a) and the gas buffer drum (3) are made of heat insulating material or provided by a heat insulating coating comprising bitumen, silicone or a combination thereof.

7. Apparatus according to claim 1, further comprising a heat utilizing unit (34).

8. Apparatus according to claim 1, wherein the gas outlet duct (8) is conducted through at least one cooling block (11) fed by a coolant (10) from external source, and the cooling block (11) is fluidly connected to a coolant (10) buffer vessel (14) opening to the tank (21) by means of a control valve (16).

9. Apparatus according to claim 1, wherein the gas room (3b) of the tank (21) comprises the second chamber (22b), and the plate (27) is a wall (21a) of the tank (21).

10. Apparatus according to claim 1, wherein the gas handling liquid (7) comprises water.

11. A method for handling gases (38), comprising the steps of:
leading said gas (38) to a bubbling tank (21);
bubbling said gas (38) into a gas handling liquid (7) through perforations formed on a plate (3a) of a gas buffer drum (3) and then a gas room (3b) of the tank (21), wherein said perforations formed on the plate (3a) of the gas buffer drum are shaped as nozzles having a blow direction (J) inclined by an acute angle α to the plate (3a);
draining off said gas handling liquid (7);
sucking said gas (38) through a gas outlet duct (8) connected into the gas room (3b) of the tank (21) by means of an air turbine (43) housed in a first chamber (22a) of a turbine house (22) and driven by a liquid turbine (23) housed in a second chamber (22b) of said turbine house (22), wherein said turbine house (22) is divided into said two chambers (22a,22b) by a plate (27);
operating the air turbine (43) by means of said liquid turbine (23);
pumping said gas handling liquid (7) drained off from the tank (21) onto a jet nozzle (26) driving said liquid turbine (23); and
leading said gas handling liquid (7) back to the tank (21).

12. The method according to claim 11, wherein the steps include bubbling said gas (38) into the handling liquid (7), then the gas room (3b) of the tank (21) through several nozzles (4) having a blow direction (J) inclined by an acute angle α to the plate (3a) and arranged along a periphery of at least one circle drawn on the plate (3a) of the drum (3).

13. The method according to claim 12, wherein the steps include arranging blow direction (J) vector of each nozzle (4) extending substantially in the direction of a subsequent nozzle (4) in a plane crossing the local tangent of said circle and being perpendicular to the plate (3a) of the gas buffer drum (3), or extending in the direction of among the subsequent nozzle (4) and a nozzle (4) situated in an adjacent circle.

14. The method according to claim 13, wherein the steps include arranging said nozzles (4) on the plate (3a) along concentric circles, and spaced apart by equal distances from each other.

15. The method according to claim 11, wherein the steps include using a plate (3a) and a gas buffer drum (3) made of heat insulating material and/or provided by a heat insulating coating comprising preferably bitumen and/or silicone.

16. The method according to claim 13, wherein the steps include conducting the gas outlet duct (8) through at least one cooling block (11) fed by a coolant (10) from external source, and fluidly connecting the cooling block (11) to a coolant (10) buffer vessel (14) opening to the tank (21) by means of a control valve (16).

17. The method according to claim 11, wherein the steps include circulating said gas handling liquid (7) through a heat utilizing unit (34) or a heat exchanger (32).

* * * * *